United States Patent [19]

Iijima

[11] Patent Number: 5,312,474
[45] Date of Patent: May 17, 1994

[54] PLANT ACTIVATOR AND MYCELIAL FERTILIZER AND METHOD

[76] Inventor: Ryusuke Iijima, 2817-62, Kosugaya cho, Sakaeku, Yokohama City, 247, Kanagawa, Japan

[21] Appl. No.: 910,471

[22] Filed: Jul. 8, 1992

Related U.S. Application Data

[63] Continuation of Ser. No. 702,565, May 20, 1991, abandoned.

[30] Foreign Application Priority Data

Oct. 4, 1990 [JP] Japan ................................ 2-268067
Oct. 31, 1990 [JP] Japan ................................ 2-296801

[51] Int. Cl.$^5$ ............................ C05F 7/00; C05F 11/08
[52] U.S. Cl. ................................................. 71/6; 71/8; 71/23; 71/26; 71/903
[58] Field of Search ................ 71/6, 8, 9, 10, 23, 71/24, 26, 903

[56] References Cited

U.S. PATENT DOCUMENTS 4,045,204 8/1977 Matsunaga et al. ................ 71/24
4,797,145 1/1989 Wallace et al. ..................... 71/27

FOREIGN PATENT DOCUMENTS 0050874 4/1977 Japan ............................... 71/9
1207485 9/1986 Japan ............................. 71/903

*Primary Examiner*—Ferris Lander
*Attorney, Agent, or Firm*—Joseph C. Mason, Jr.; Ronald E. Smith

[57] ABSTRACT

This invention relates to a plant activator, a mycelial fertilizer, and a method of producing the fertilizer. The essential component of the activator and the fertilizer is purified pyrolignous acid. The plant activator includes 80-97 parts by weight of purified pyrolignous acid and 3-20 parts by weight of saccharide containing glucose. The mycelial fertilizer having purified pyrolignous acid includes predominant thermoactinomyces as mycelium. The mycelium is obtained by incubation and fermentation on a porous carrier while a pH of 7.5-9.5 is maintained. The plant activator revives plants weakened by stress. The mycelial fertilizer and method of producing that fertilizer includes predominant thermoactinomyces which beneficially affect farm products.

6 Claims, No Drawings

PLANT ACTIVATOR AND MYCELIAL FERTILIZER AND METHOD

This is a continuation of copending application(s) Ser. No. 07/702,565 filed on May 20, 1991, and now abandoned.

TECHNICAL FIELD

This invention relates to a plant activator and mycelial fertilizer and a method of producing that fertilizer.

BACKGROUND ART

Plants are easily weakened by stress. Sources of stress include extreme changes in temperature or humidity, chemicals, biological damage and physical damage due to cutting of flowers, leaves and other parts of the plant.

The freshness and beauty of a plant will rapidly deteriorate due to these stresses.

Various chemicals have been synthesized that have some utility in restoring stress affected plants but such chemicals adversely affect the environment and sometimes produce undesirable effects in the plants. For example, many of these chemicals kill microorganisms, earthworms, and other beneficial lifeforms that live in the soil. The resulting sterile soil requires the application of still further inorganic chemicals until the natural living order is destroyed.

Accordingly, many farmers are returning to the use of organic fertilizers such as compost in an effort to restore life to the soil and to break the dependency upon synthesized chemical fertilizers. However, many available organic fertilizers and plant activators are not easily obtainable in large quantities, and are not as effective as some of the synthetic materials. Thus, there is a need for improved organic fertilizers and plant activators that can be economically produced in large quantities, but the prior art, when considered as a whole in accordance with the requirements of law, neither teaches nor suggests how such improved substances could be provided.

DISCLOSURE OF THE INVENTION

The longstanding but heretofore unfulfilled need for an organic plant activator that has an immediate and favorable effect on plants weakened by stress and that enhances the reparative power and disease-resistance of plants without causing pollution or environmental damage is now fulfilled.

An environmentally harmless soil conditioner with good productively is also disclosed.

An object of this invention is to provide an environmentally safe, fast-acting activator for restoring feeble plants which are suffering from various stresses including physical damage due to extreme changes in temperature and humidity, cutting, chemical damage and the like.

Another object is to provide a harmless mycelial fertilizer and an economical method of producing that fertilizer including predominant thermoactinomyces which are effective for growth of farm products.

These and other important objects of the invention are achieved by including purified pyrolignous acid as an essential component of the novel compound.

The above and other related objectives are realized by provision of a novel plant activator containing 80-97 parts by weight of purified pyrolignous acid and 3—20 parts by us acid and 3-20 parts by weight of saccharides containing glucose. Moreover, the invention includes mycelial fertilizer having purified pyrolignous acid. More particularly, the fertilizer includes predominant thermoactinomyces as said mycelium, and said mycelium is incubated and fermented on a porous carrier having a pH of 7.5-9.5. This invention also includes a method of producing this fertilizer.

Purified pyrolignous acid is a useful material which is now applied to various chemicals including industrial materials, food additives, medicines, agricultural chemicals and soil conditioners.

The plant activator and mycelial fertilizer of the present invention include purified pyrolignous acid as an essential component and thereby have an immediate and favorable effect on feeble plants and quick fermentation and growing of thermoactinomyces, respectively.

DETAILED DESCRIPTION OF THE PREFERRED EMBODIMENT

The purified pyrolignous acid which is an essential component of this invention is obtained by purification of crude pyrolignous acid.

The crude pyrolignous acid is obtained by cooling the smoke produced by thermal decomposition when wood and plants are carbonized.

25-45 parts by weight of crude pyrolignous acid is produced per 100 parts by weight of seasoned wood.

The acid is a dark-brown liquid having a characteristic irritating odor. It contains 80-90% by weight of moisture although the percentage varies with the kind of wood burned.

The other component of the acid is wood tar (polyaromatics such as 3, 4-benzpyrene), floating dust, organic acids such as formic acid, acetic acid, propionic acid, butyric acid, valeric acid, valerolactone, caproic acid etc., or lactone, alcohol such as methylalcohol, arylalcohol, etc., esters such as methylacetate, metylformate, aldehydes such as form aldehyde, acetaldehyde, furfural, etc., and ketones such as acetone, dietyl ketone, methylethylketone, etc.

As used in this invention the purified pyrolignous acid is obtained by elimination of floating oil and dust from the crude acid by suitable pre-treatments such as distillation, decantation, and the like.

In this purification process, wood tar, floating debris and dust are substantially eliminated.

The chemical properties of purified pyrolignous acid obtained by these methods include a pH of 2.6-3.8, a specific gravity of 1 010-1.019, an organic acid content of 2.50-5.50 by weight, and less than 0.15% by weight of dissolved tar.

The purified acid has a light blue yellow appearance, or it may be a clear liquid; its color is determined by the type of wood used as the raw material.

The novel plant activator having purified pyrolignous acid is composed of 80-97 parts by weight of purified pyrolignous acid and 3-20 parts by weight of saccharide containing glucose.

The saccharide containing glucose of this invention includes not only glucose but also saccharide which contains more than 10% by weight of glucose as monosaccharide. For example, invert sugar, which is a mixture of the same quantity of glucose and fructose, and the like, may be used.

The glucose content proportion is preferably in the range of 3-20% by weight; 10% by weight has been found to be highly effective.

If the glucose concentration is less than 3%, the activating effect is ineffective to restore plants weakened by various stresses.

If the glucose concentration is more than 20%, the concentration of the plant's root cells outside the cytoplasm is higher than the concentration of root cells inside the cytoplasm.

Therefore, osmotic pressure causes the root cells inside the cell water to flow out to the outside of the plant's body, thereby killing the plant.

The purified pyrolignous acid and solution containing glucose are selected as the essential components in this invention because purified pyrolignous acid has several desirable characteristics such as its sterilizing effect, its aromatic properties, its safety, etc. Moreover, its frequency of utilization as an agricultural chemical and soil conditioner is also increasing.

Purified pyrolignous acid is further desireable because it assists in increasing glucose penetration into the plant body through the roots or leaf surfaces by osmotic action.

The penetrating pressure of a glucose only solution into the plant body, especially roots and leaves, is less than the pressure attained by the mixture that includes glucose and purified pyrolignous acid.

If the penetrating pressure is weakened, the restorative effect provided by the solution to the plant is not as effective as a campher agent.

The restorative effect is revealed by using the solution that includes purified pyrolignous acid.

The present inventor speculates that acetic acid in the purified pyrolignous acid might be responsible for this effect.

Furthermore, the saccharide containing glucose selected as the essential component in this invention is believed to be the most effective saccharide as the plant activator for the weakened plant, which conclusion is based on empirical studies conducted by the present inventor.

Monosaccharides not including glucose, for example natural typical hexose such as mannose and galactose, or natural typical pentose such as arabinose and xylose, etc., do not affect the stress-weakened plant as well as monosaccharides containing glucose.

On the other hand, polysaccharides such as starch or the like do not penetrate into roots or leaf cells due to their molecular weight.

Both D-glucose and L-glucose, which are commercially available, are favorably used as the glucose of this invention.

The novel plant activator to be agrochemically effective, preferably may be sprayed or otherwise applied onto the plant without mixing it with any other component.

However, it may be mixed with fertilizer by admixing with a suitable diluent, extending agent, suspension agent and emulsifying agent if necessary.

The novel plant activator to be agrochemically effective, preferably is diluted about 50-300 times, depending upon the type of plant, the state of the plant's stress and the type of applicator used.

The leaf part of the plant is the most suitable point of application, but the activator may be effectively applied to other plant parts as well. Water or moisture is absorbed from the surface of leaves and roots of plants but the permeated moisture from a leaf or stalk is less than the absorbed moisture from a root. However, the permeated moisture from the leaf part immediately restores the health of a plant weakened by various stresses.

This novel plant activator may be applied to all types of plants such as foliage plants such as house plants, dwarfed trees (Japanese bonsai), garden plants, domesticated plants or the like.

In this invention which includes purified pyrolignous acid and saccharides containing glucose as essential components, the plant activator is sprayed onto the plant and is permeated into the leaves or roots of the plant and effectively restores to health each cell of the plant that has been weakened by various stresses, like a camphor agent.

The novel activator quickly brightens the leaves and straightens the stalk of a drooping plant.

The novel mycelial fertilizer and method of making that fertilizer will now be described in detail.

The thermoactinomyces usable favorably in the invention are helical germs in thermoactinomyces particularly growable at high temperatures of 55°-80° C. such as, for example, Thermoactinomyces vulgeris, Thermoactinomyces spora actinobifida (white) and the like.

The thermoactinomyces are selected as the main component of the mycelial fertilizer in the invention because thermoactinomyces have very few germs that are harmful to plants.

Further, there are plant growth hormones and various vitamins in the metabolites of the thermoactinomyces; accordingly, these materials and self-decomposition of thermoactinomyces effectively affect the growth of farm products by serving as sources of nitrogen supply or nutrition for the soil.

In this invention, thermoactinomyces are obtained by incubation and fermentation on a porous carrier and in this fermentation process, 2-20 parts by weight of the purified pyrolignous acid is kneaded with the porous carrier or impregnated beforehand into the porous carrier.

The purified pyrolignous acid is selected as the essential component in this invention because it is believed that the thermoactynomyces are fermented and grow immediately on the porous carrier as a result of the purified pyrolignous acid.

A fermentation period of at least five days and a temperature between 55°-80° C. is required to obtain the novel mycelial fertilizer.

However, a shortened fermentation period of at least two days is made possible by using purified pyrolignous acid.

Moreover, the novel mycelial fertilizer is not inferior to the prior art of mycelial fertilizers which affect plant growth. On the contrary, this invention is superior to the prior art.

The purified pyrolignous acid is kneaded with an organic substance or impregnated beforehand into the porous carrier which incubate and fermentate thermoactynomyces.

The pH of the porous carrier is maintained between 7.5-9.5, preferably pH 8-9 for the effective growth of thermoactynomyces.

As a result, the growth of filamentous fungi and bacterium etc., is inhibited and a constant amount of thermoactynomyces is maintained in the mycelial fertilizer.

The carrier is limited to a porous carrier because only a porous carrier is able to admit Water and air for the growth of thermoactinomyces as essential components during the storage of mycelial fertilizer or during its use in the soil.

Any organic or inorganic porous carrier is suitable for use if its pH can be maintained in the range of 7.5-9.5.

Examples of suitable porous carriers include foams or inorganic, organic or synthetic resin such as charcoal, active carbon, coal, coke, active coke, peat, palmculite, perlite, bentonite and urethane foam, etc.

In the invention, the mycelium comprising predominant thermoactinomyces wherein the thermoactinomyces occupy 10% of the microorganism colony in the mycelium may be used. However, the mycelium comprising thermoactinomyces of at least more than 50% of the microorganism colony is more preferable.

Where the thermoactinomyces concentration is below 50%, the propagation of harmful germs, bacteria or filamentous fungi, may occur after the mycelium has been applied to the soil. Where the thermoactinomyces concentration is more than 50% in the microorganism colony in the mycelium, the dominant propagation of thermoactinomyces is secured, and the primary object of the invention is attained.

The appropriate method of producing the mycelial fertilizer according to the invention will now be described.

In this invention, 3-20 parts by weight of the purified pyrolignous acid is kneaded with the porous carrier of 3-30 mesh in particle size in the state of pH 7.5-9.5 and an organic substance having less than 15% carbon and 25-60% in water content, preferably.

Purified pyrolignous acid is kneaded with the porous carrier and organic substance because it causes the thermoactynomyces on the porous carrier to grow quickly and surely.

Moreover, use of purified pyrolignous acid shortens the fermentation period required to obtain the novel mycelial fertilizer of this invention, as mentioned earlier.

After fermentation, purified pyrolignous acid that remains in the mycelial fertilizer may itself function as an effective fertilizer.

The content of purified pyrolignous acid is preferably mixed 2-20 parts by weight.

Where there is less than 3 parts by weight content, the thermoactinomyces fermentation process is inhibited.

On the other hand, where there is more than 30 parts by weight content, the water content in the overall fermentation system is too high.

The pH range of the porous carrier is limited to 7.5-9.5 for optimal growth of thermoactinomyces during the time required for making and storing the mycelial fertilizer.

As a result of this limited pH range, growth of filamentous fungi including many harmful germs is inhibited.

The particle size of the porous carrier is limited to 3-30 mesh.

Where a fine porous carrier having more than 30 mesh is used, the fermentation temperature cannot be maintained at more than 40° C., and insufficient growth of thermoactinomyces results.

Where the larger particle size of the porous carrier is less than 3 mesh, it is difficult to handle during production of the fertilizer.

The porous carrier absorbing purified pyrolignous acid forms about 50-78 parts by weight of the inventive fertilizer.

Where the fertilizer includes less than 50 parts by weight of porous carrier, the parts by weight of undecomposed organic substance increases in quantity. Such increase in undecomposed substance is unfavorable for maintaining good fermentation conditions for reasons given below.

Where the porous carrier exceeds 78 parts by weight, the water supplied from organic substances decreases in quantity and it therefore becomes difficult to maintain a predetermined water content in the fermentation system and hence to maintain a favorable fermentation temperature.

The porous carrier that has absorbed the purified pyrolignous acid is kneaded with 20-30 parts by weight of an organic substance having a carbon content less than 15% and having a water content between 25-60%.

If the organic substance has a carbon content greater than 15%, cellulose fibrous content increases in the fermentation system, so that the amount of cellulose is in more demand than the ordinary case and the amount of cellulose in actinomyces becomes dominant in the fermentation system.

This explanation is based on the inventor's experimental knowledge.

The water content of the organic substance is limited to 25-60% because the moisture content of the fermentation system in the kneading process is supplied only from the organic substance and the required temperature for the fermentation of thermoactinomyces is supported only when the moisture content is from 30 to 40%.

If the water content of the fermentation system is more than 40% or less than 30%, the fermentation condition will not support the fermentation of thermoactinomyces.

20-30 parts by weight of the organic substance is preferably used in this system.

If less than 20 parts by weight is used, the organic substance provides insufficient growth of mycelium in each carrier. Moreover, the mycelium will not attach to each carrier in a uniform dispersion.

If more than 30 parts by weight of organic substance are mixed, the mixing proportion of mycelium and porous carrier is in an unbalanced state and the amount of mycelium or the amount of undecomposed organic substance increases in the system; neither situation is desirable.

The mixture is maintained at a temperature above 15° C. to achieve uniformity of fermentation. The system is insulated so that ambient temperatures do not affect the fermentation.

If the temperature is allowed to drop below 15° C., fermentation does not occur.

The fermentation temperature is maintained between 55°-80° C., preferably 60°-70° C.

If the fermentation temperature drops below 55° C., the temperature is restored to 55°-60° C. by feeding air (aeration) at least 15° C. above 55° C. through a pipe and pump at the base part of the fermenting bath for as long as is needed to promote fermentation.

The fermentation temperature should not exceed 80° C. because the cellulose content in the system depends upon the amount of organic substance having a carbon content less than 15% and the water content depends upon the amount of porous carrier; excessive temperature creates imbalances.

By fermentation for at least two days under the above conditions, the mycelial fertilizer having purified pyrolignous acid including predominant thermoactinomyces as said mycelium and said mycelium obtained by incubation and fermentation of the porous carrier having a pH of 7.5-9.5 is produced.

The fermentation period is preferably at least two days, more preferably five days.

The fermentation temperature must be kept between 55°-80° C., because the thermoactinomyces cannot be obtained at the expected proportion rate of thermoactinomyces in the mycelium colony at temperatures below 55° C. Moreover, growth of anaerobic bacteria occurs in the system when the temperature exceeds 80° C.

The raw materials of this invention, being 20-30 parts by weight of the organic substance having less than 15% carbon content and said organic substance having a 25-60% water content, and including 50-78 parts by weight of a porous carrier and said carrier having a 3-30 mesh particle size, ensure that the fermentation temperature will not exceed 80° C.

Accordingly, when pouring water on the ferment does not increase the fermentation temperature to the preferred 55°-80° C. range, it becomes necessary to perform an aeration, i.e., to switch back to a conventional fermentation process. However, the fermentation temperature will not exceed 80° C., even if this aeration is performed.

TEST EXAMPLES

The test examples of the invention are described in the following examples which show the effect of the novel plant activator and mycelial fertilizer. However, this invention is not limited by the test examples.

Test example 1 illustrates the effect of the novel plant activator on a lawn (Zoysia tenuifolia Willd.).

Six types of gardening pots, named A, B, C, D, E and F, each pot being 20 cm in diameter and 30 cm in height, were prepared and two roots of the lawn were planted therein. Thereafter, these were put in full sunlight for a week, without spraying water thereon. This resulted in a stressed, drooping lawn.

Six different preparations were then prepared, each having a volume of one liter. The content of each preparation is given below, with pot A receiving the solution described in Example 1, pot B receiving the solution described in Comparative Example 1, and so on. Pot F was the control pot, and received a one liter dose of water only. All solutions were sprayed on the plants.

After 6 hours, the appearance of each pot of Zoysia tenuifolia Willd was observed and valued as shown in Table 1.

EXAMPLE 1

10 mg of a-D-glucose was dissolved in 100 ml of purified pyrolignous acid to obtain an undiluted solution of the novel plant activator.

This undiluted solution was then diluted 50 times with distilled water to prepare the solution that was sprayed into pot A.

Comparative Example 1

10 mg of sucrose was dissolved in 100 ml of purified pyrolignous acid, and thereafter that solution was diluted 50 times with distilled water.

Comparative Example 2

10 mg of wheat starch was dissolved in 100 ml of purified pyrolignous acid, and thereafter that solution was diluted 50 times with distilled water.

Comparative Example 3

10 mg of a-D-glucose was dissolved in 100 ml distilled water, and thereafter the solution was diluted with 50 times that amount of distilled water.

Comparative Example 4

50 mg of a-D-glucose was dissolved in 100 ml of purified pyrolignous acid, and thereafter the solution was diluted with 50 times the amount of distilled water.

TABLE 1

|   |   | Appearance of Leaves |
|---|---|---|
| A | Example 1 | A |
| B | Comparative Example 1 | C |
| C | Comparative Example 2 | D |
| D | Comparative Example 3 | C |
| E | Comparative Example 4 | D |
| F | Control Example | C |

(Grade)
[Appearance of Leaves]
A: brightly greened and freshened up
B: a few greened leaves
C: the same as before spraying
D: drooping more than before spraying Test example 2 illustrates the effect of the novel mycelial fertilizer by following the preferred example and comparative examples.

Example 2

As the porous carrier, 60 parts by weight of coconut-husk charcoal of pH 8.2, 25 mesh pass in particle size and 200 m$^2$/g of internal surface area was used.

The porous carrier was kneaded with 25 parts by weight of fowl droppings of pH 8.8, 32.9% in water content and 9.6% carbon content and 15 parts by weight of purified pyrolignous acid.

The kneaded mixture was allowed to keep in a fermenter and the inside temperature of the fermenter was maintained at 55° C.

The temperature of the kneaded mixture was measured during fermentation, and at a first time when the rise in temperature started and at a second time when the temperature of the kneaded mixture was lowered below 55° C. during fermentation, air in the system was directly fed into the ferment by a pump to raise the temperature at said first time and to maintain a constant temperature at said second time.

This fermentation was carried out for three days.

Throughout the fermentation process, the temperature in the ferment system did not exceed 80° C.

After stopping the fermentation, the mycelia fertilizer was analyzed. It had the following characteristics: pH 8.9, total nitrogen 1.65%, pure protein 5.8%, vitamin $B_1$ 0.01 mg%, vitamin $B_2$ 0.06 mg%, pantothenic acid 0.17 mg% and nicotinic acid amide 0.30 mg%.

To identify the germ in the mycelium, four Petri dishes that were 9 cm in diameter and 1.5 cm in depth were filled with culture medium of agar and distilled water, and 20 particles of the above-mentioned mycelium were inoculated at equal spaces onto three of the Petri dishes.

As a comparative example, the fourth Petri dish was treated the same as the other three Petri dishes except for the use of untreated coconut-husk charcoal particles of 25 mesh pass.

After all four Petri dishes were cultured at 25° C. for four days, actinomyces and filamentous fungi were classified and analyzed by the number of colonies generated.

In the culture, the medium was sterilized in an autoclave at 120° C. under 1 atmospheric pressure for 20 minutes in advance.

As a result, in the first Petri dish, 7.4 colonies of thermoactinomyces existed per particle of the sample on the average, while 5.0 colonies of filamentous fungi existed.

In the second Petri dish, 4.1 colonies of thermoactinomyces existed per particle of the sample on the average, while 0.04 colonies of filamentous fungi existed.

Among them, in thermoactinomyces, helical germs were dominant and, in filamentous fungi, Cladosporium group, Penicillium group and Nigrospora group were found.

Since Cladosporium and Penicillium in these filamentous fungi were found also in the fourth Petri dish having only coconut-husk active carbon particles which were used as a control, these were considered to be germs mixed from air.

Accordingly, thermoactinomyces were practically dominant in the microorganism colonies of mycelia fertilizer.

The examples using such thermoactinomyces are described in the following table.

TABLE 2

|  | Content Rate of purified pyrolignous acid | ORGANICS | | | | CARRIER | | | |
|---|---|---|---|---|---|---|---|---|---|
|  |  | A | B | C | D | E | F | G | H |
| Example 3 | 20 | 10 | 40 | 1 | 20 | 30 | 3 | 8.4 | 60 |
| Example 4 | 15 | 12 | 30 | 1 | 20 | 10 | 3 | 8.3 | 65 |
| Example 5 | 10 | 10 | 35 | 2 | 25 | 20 | 3 | 8.0 | 65 |
| Example 6 | 5 | 15 | 35 | 2 | 30 | 15 | 3 | 8.0 | 65 |
| Comparative Example 5 | 0 | 10 | 40 | 1 | 30 | 30 | 3 | 8.4 | 70 |
| Comparative Example 6 | 50 | 10 | 30 | 1 | 20 | 25 | 3 | 8.4 | 30 |
| Comparative Example 7 | 15 | 40 | 30 | 1 | 20 | 30 | 3 | 8.3 | 65 |
| Comparative Example 8 | 10 | 10 | 65 | 2 | 50 | 20 | 3 | 8.0 | 40 |

A ... Rate of Carbon
B ... Moisture Content
C ... Species
D ... Content Rate
E ... Mesh
F ... Species
G ... pH
D ... Content Rate
1 fowl droppings.
2 a mixture of cow dung and dry grasses and so on.
3 charcoals.

In these tests, in addition to Example 2, as shown in Table 2, examples and those for comparison were made wherein various types of carriers and organic substance were adopted and wherein quantities of purified pyrolignous acid were varied, and these were treated under the same fermentation condition as Example 2.

Use Example 1

Method
1) Scale of test: Pot test (1/5000 a pot)
2) Test item; Korean lawn grass (Zoysia temuifolia Willd.)
3) Test soil: Sandy soil
4) Test period: Apr.-Oct.
5) Test section
  (1) Control section: 3 pots
  (2) Each example section: each 3 pots using 10% in soil, and each 3 pots using 20% in soil.
  (3) Each comparative example section: each 3 pots using 10% in soil, and each 3 pots using 20% in soil.

In addition, 3 g of usual compound fertilizer was used for each pot.

The test soil was coarse sand 90.1%, fine said 9.0%, silt 0.0%, clay 0.9%, base substitution capacity 0.44 me/100 g and pH 6.8.

The weight of stem was measured after 6 months.

The average weight of stem value is shown in Table 3.

TABLE 3

|  | Weight of Stem | |
|---|---|---|
|  | 10% parts | 20% parts |
| Example 2 | 22.5 | 37.1 |
| Example 3 | 20.2 | 35.6 |
| Example 4 | 19.7 | 33.8 |
| Example 5 | 21.1 | 35.8 |
| Example 6 | 18.9 | 31.7 |
| Comparative Example 5 | 17.6 | 25.3 |
| Comparative Example 6 | 15.4 | 25.4 |
| Comparative Example 7 | 12.1 | 20.5 |
| Comparative Example 8 | 14.9 | 28.1 |
| Control | 10.7 | |

Use Example 2

Method
1) Scale of test: Cultivating Test in soil (10m²/area, area system)
2) Test item: Melon (Cucumis melo L.)
3) Test soil: Sandy soil
4) Test period: Mar.
5) Test Type: Harvest time at early summer
  (1) Planting density: 45 cm intervals on line in each plant on ridge of 1.5 m width
  (2) Vine Arrangement: every parent vine has 22 knots being 2 elder vines each of which has 2 fruits
  (3) Cultivation type: Vertical cultivation
  (6) Test Classification

| Control | |
|---|---|
| Each example | 10% in soil |
|  | 20% in soil |
| Each comparative example | 10% in soil |
|  | 20% in soil |

The test was conducted by using the melon (Cucumis melo L.) in Use Example 2, and the length of vine and the number of leaves in the melon after 1 month were measured. The resulting average values are shown in Table 4.

TABLE 4

|  | 10% parts | | 20% parts | |
|---|---|---|---|---|
|  | I | J | I | J |
| Example 2 | 38.1 | 10 | 42.3 | 11 |
| Example 3 | 36.4 | 10 | 40.0 | 11 |
| Example 4 | 36.9 | 9 | 40.5 | 10 |
| Example 5 | 37.5 | 10 | 41.1 | 11 |
| Example 6 | 37.0 | 10 | 40.8 | 11 |
| Comparative Example 5 | 34.5 | 8 | 39.7 | 9 |

TABLE 4-continued

|  | 10% parts | | 20% parts | |
| --- | --- | --- | --- | --- |
|  | I | J | I | J |
| Comparative Example 6 | 29.7 | 6 | 35.1 | 7 |
| Comparative Example 7 | 28.1 | 5 | 33.4 | 6 |
| Comparative Example 8 | 28.9 | 6 | 34.3 | 7 |
| Control | 25.3 | 5 | | |

I ... The Length of Vine (cm)
K ... The Number of Leaves (piece)

What is claimed is:

1. A composition for restoring feeble plants consisting essentially of:
   (a) 80–97 parts by weight of purified pyrolignous acid characterized by a light blue yellow or substantially clear appearance, a pH of 2.6–3.8, a specific gravity of 1.010–1.019, an organic acid content of 2.50%–5.50% by weight, and less than 0.15% by weight of dissolved tar; and
   (b) 3–20 parts by weight of monosaccharide containing glucose in an amount from 3–20% by weight.

2. A method of restoring feeble plants, comprising the step of applying to the plants or their locus an agrochemically effective amount of a composition according to claim 1.

3. A mycelial fertilizer, consisting essentially of:
   (a) 80–97 parts by weight of purified pyrolignous acid characterized by a light blue yellow or substantially clear appearance, a pH of 2.6–3.8, a specific gravity of 1.010–1.019, an organic acid content of 2.50–5.50% by weight, and less than 0.15% by weight of dissolved tar;
   (b) 3–20 parts by weight of monosaccharide containing glucose;
   (c) thermoactinomyces;
   (d) a porous carrier characterized by a pH from 7.5 and 9, and 5.
   (e) an organic substance having less than 15% carbon and a water content of 25%–60%.

4. A fertilizer according to claim 3, wherein the porous carrier is the incubation and fermentation site for the thermoactinomyces.

5. A fertilizer according to claim 4, wherein the particle size of the porous carrier is from 3–30 mesh.

6. A method of promoting the growth of plants, comprising the step of applying to the plants an effective amount of the fertilizer according to claim 3.

* * * * *